(12) United States Patent
Bishop et al.

(10) Patent No.: US 7,374,304 B2
(45) Date of Patent: May 20, 2008

(54) DISPLAY WITH HOUSING HAVING CAVITY FOR SECONDARY LIGHT SOURCE

(75) Inventors: Neil H Bishop, Windsor (CA); Nobuhiro Kobayashi, Commerce Township, MI (US)

(73) Assignee: Yazaki North America, Inc., Canton, MI (US)

( * ) Notice: Subject to any disclaimer, the term of this patent is extended or adjusted under 35 U.S.C. 154(b) by 111 days.

(21) Appl. No.: 11/359,910

(22) Filed: Feb. 22, 2006

(65) Prior Publication Data
US 2007/0211459 A1    Sep. 13, 2007

(51) Int. Cl.
*G01D 11/28* (2006.01)
(52) U.S. Cl. .......................... 362/23; 362/29; 362/231
(58) Field of Classification Search .................. 362/23, 362/27, 29, 30; 116/48–49, 54, 286
See application file for complete search history.

(56) References Cited

U.S. PATENT DOCUMENTS

| 1,871,552 | A |   | 8/1932  | Padesky       |        |
|-----------|---|---|---------|---------------|--------|
| 4,012,632 | A | * | 3/1977  | Stone         | 362/23 |
| 4,878,387 | A |   | 11/1989 | Muramatsu     |        |
| 4,965,564 | A |   | 10/1990 | Fabry et al.  |        |
| 5,063,379 | A |   | 11/1991 | Fabry et al.  |        |
| 5,227,767 | A |   | 7/1993  | Tanaka        |        |
| 5,895,115 | A |   | 4/1999  | Parker et al. |        |
| 6,158,867 | A |   | 12/2000 | Parker et al. |        |
| 6,302,551 | B1| * | 10/2001 | Matumoto      | 362/27 |
| 6,318,872 | B1| * | 11/2001 | Kato et al.   | 362/26 |
| 6,367,940 | B1|   | 4/2002  | Parker et al. |        |
| 6,600,427 | B2|   | 7/2003  | Simon et al.  |        |
| 6,926,417 | B2|   | 8/2005  | Mikami        |        |
| 6,951,399 | B2| * | 10/2005 | Tamura        | 362/23 |

FOREIGN PATENT DOCUMENTS

JP            62079315            4/1987

* cited by examiner

*Primary Examiner*—Ali Alavi
(74) *Attorney, Agent, or Firm*—Harness, Dickey & Pierce, P.L.C.

(57) ABSTRACT

A display with a housing and an indicium that may be selectively back-illuminated. The housing includes a cavity having a first portion and a second portion. A first light source that provides light of one color and a first intensity is disposed in the first portion. A second light source that provides light of another color and a second, higher intensity is disposed in the second portion. The second portion is disposed in-line and encompasses an area that includes the indicium. Operation of only the first light source back-illuminates the indicium with a first color. Operation of the second light source back-illuminates the indicium with a second color regardless of whether the first light source is illuminated or not. A member may be disposed between the first and second portions to aid in controlling the brightness and uniformity with which the indicium is illuminated by the first light source.

16 Claims, 4 Drawing Sheets

DISPLAY WITH HOUSING HAVING CAVITY FOR SECONDARY LIGHT SOURCE

INTRODUCTION

The present disclosure relates to lighted display systems, and more particularly to a housing cavity for a secondary light source.

Vehicle displays typically require illumination to enable an operator to easily read the display indicia in low visibility or nighttime driving conditions. Generally, the displays can include a display surface (e.g., an appliqué) that can be mounted to a housing disposed forwardly of a printed circuit board (PCB). The PCB can include a light source, such as a light emitting diode (LED), that may be employed to selectively illuminate a portion of the display indicia. Often times, it may be desirable to illuminate portions of the display indicia in two different colors to notify the operator of a particular event, such as a low fuel condition.

To selectively illuminate a portion of the display indicia in different colors, the housing may be formed with two separate apertures, with each aperture housing a differently colored LED. Alternatively, two separate housings can be used to house the differently colored LED's. It will be appreciated that construction of the display with light sources of two or more colors is relatively expensive.

SUMMARY

In one form, the present teachings provide a display that includes a housing, a first light source, a second light source and an appliqué. The housing defines a cavity having a first portion and a second portion. The first light source is disposed in the first cavity and is selectively operable for providing illumination of a first intensity. The second light source is disposed in the second cavity and is selectively operable for providing illumination with a second intensity wherein the second intensity is greater than the first intensity. The appliqué is coupled to the housing and includes an opaque background and a translucent display indicium. The translucent display indicium is disposed in-line with the second light source. The first and second light sources can be operated in a first mode, wherein the first light source is operated and the second light source is not operated so that the display indicium is back-illuminated by the first light source so that the back-illuminated display indicium has a first color that is associated with a color of the first light source. The first and second light sources can also be operated in a second mode, wherein the first and second light sources are operated so that the display indicium is back-illuminated by the first and second light sources so that the back-illuminated display indicium has a second color that is associated with a color of the second light source.

In another form, the present teachings provide a method that includes: providing a vehicle display with an appliqué, a first light source and a second light source, the appliqué having a display indicium, the first light source selectively generating light at a first wavelength, the second light source selectively generating light at a second wavelength that is longer than the first wavelength; illuminating the first light source such that the display indicium is back-illuminated by light of a first color; and illuminating the second light source while the first light source is illuminated such that the display indicium is back-illuminated by light of a second color.

In yet another form, the present teachings provide a display with an indicator surface, a housing, a circuit board, a first light emitting diode, a second light emitting diode and a member. The indicator surface is configured to provide information to a person viewing the display and includes a display indicium. The housing has a chamber with a first section and a second section. The first section is located directly beneath the indicator surface and encompasses an entire area of the indicator surface. The circuit board is coupled to the housing and closes a rearward side of the chamber. The first light emitting diode is mounted on the circuit board within the second section of the chamber and can be operated to light the indicator surface in a first condition. The second light emitting diode is differently colored and is mounted on the circuit board within the first section of the chamber. The second light emitting diode can be operated to light the indicator surface in a second condition. The member is coupled to the housing and partially separates the first section of the chamber from the second section of the chamber. The member has an edge that is spaced apart from the circuit board by a predetermined distance such that the member cooperates with the first light emitting diode to control an intensity and uniformity of light transmitted through the display indicium when only the first light emitting diode is producing light.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION OF THE VARIOUS EMBODIMENTS

Figure 1:
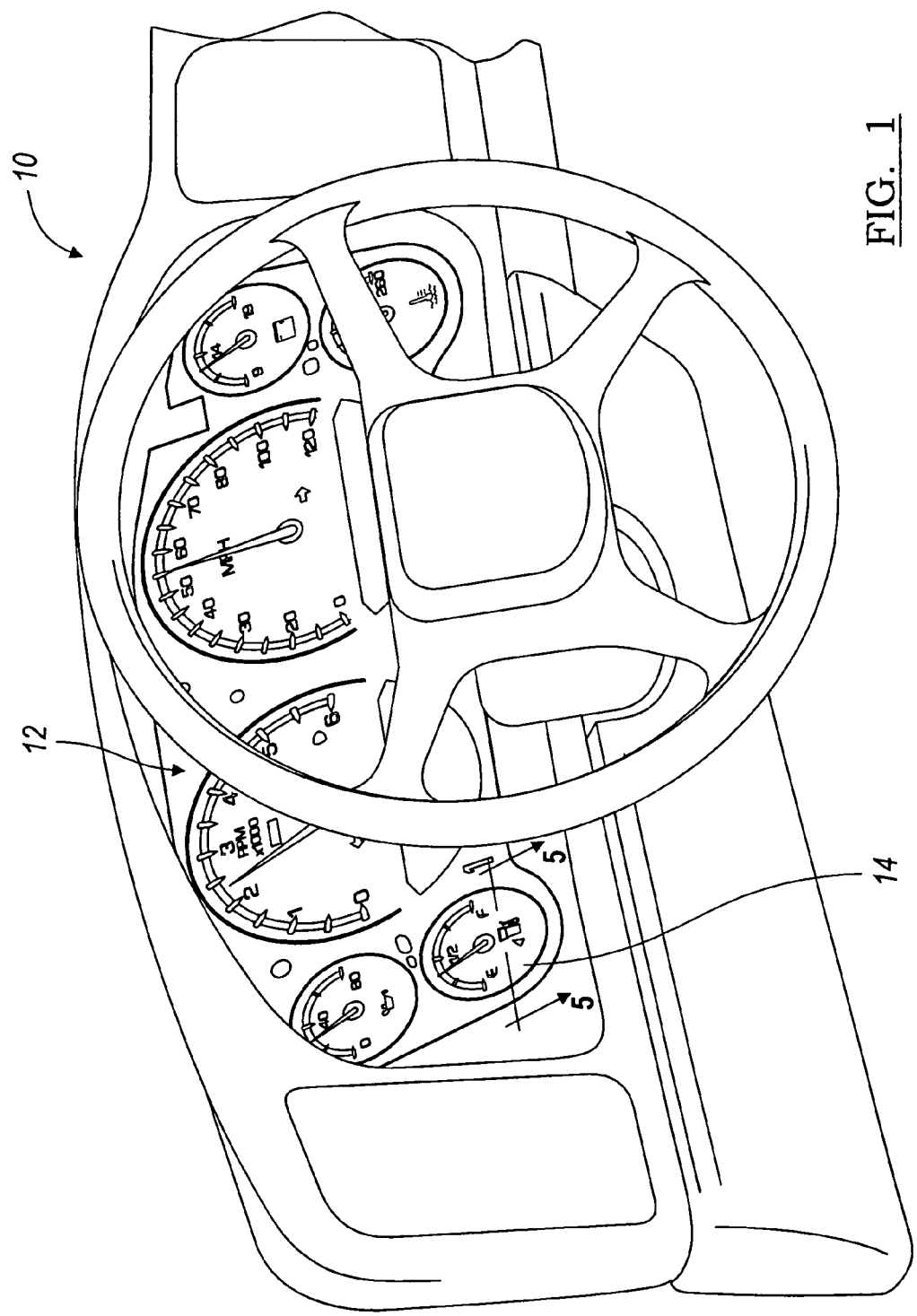
FIG. 1 is a perspective view of a portion of a vehicle having a display constructed in accordance with the teachings of the present disclosure.

With reference to FIG. 1 of the drawings, a vehicle 10 with an instrument cluster 12 having one or more displays 14 constructed in accordance with the teachings of the present disclosure is illustrated. In the particular example provided, the display 14 is a fuel gage, but it will be appreciated that the teachings of the present invention have applicability to other types of displays including speedometers, tachometers, and gages for displaying a vehicle characteristic, such as engine oil pressure, alternator voltage, or engine temperature.

Figure 2:
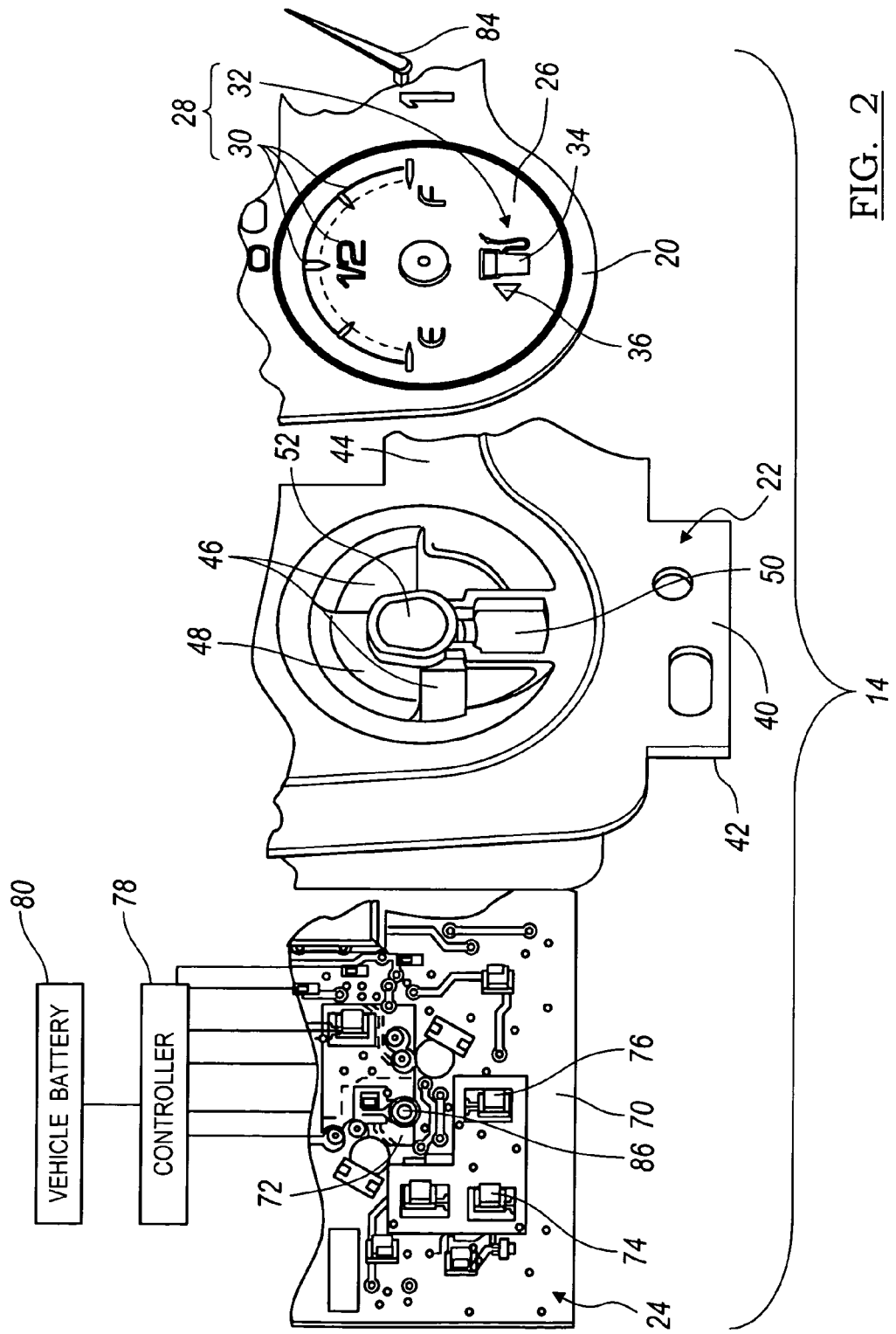
FIG. 2 is an exploded perspective view of a portion of the display of FIG. 1.
Figure 3:
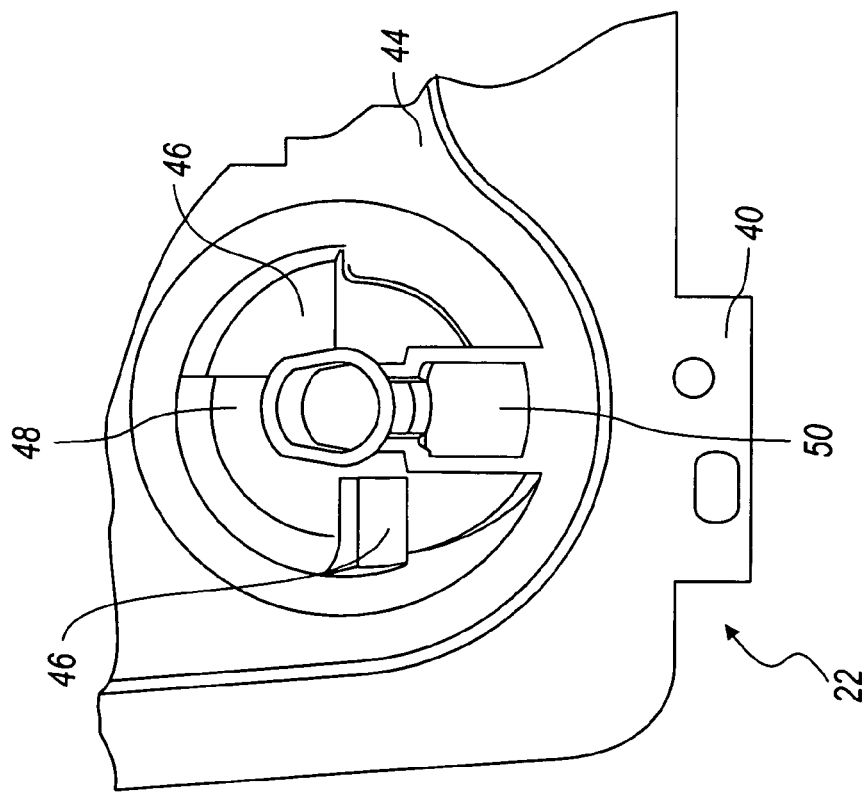
FIG. 3 is a front view of a portion of the display of FIG. 1, illustrating the housing in more detail.

With reference to FIGS. 2 and 3, the display 14 can include a conventional appliqué 20, a housing 22 and a circuit board assembly 24. The appliqué 20 can conventionally include an opaque background 26 and a plurality of translucent display indicia 28, such as numerals, letters, text, symbols, and scales. In the example provided, the display indicia 28 includes a first set of indicia 30, which can be associated with the scale of a fuel gage, and a second set of indicia 32, which can include a gasoline pump symbol 34 and a triangle symbol 36 that is set to a side of the gasoline pump symbol 34.

The housing 22 can have a front face 40 and a rear face 42. The front face 40 can include an optional appliqué recess 44, which can be sized and shaped to receive the appliqué 20 therein, a pair of first lighting apertures 46, a reflective zone 48 that is disposed between the first lighting apertures 46, a second lighting aperture 50 and a drive aperture 52. A paint (e.g., white paint) or reflective material can be applied to the housing 22 in the area of the reflective zone 48. Optionally, a light pipe (not shown) can be housed in the reflective zone 48. The first lighting apertures 46, the reflective zone 48 and the optional light pipe (not shown) can be employed to illuminate the first set of indicia 30 and as such, can be constructed in a conventional and well known manner that need not be described in detail herein.

Figure 4:
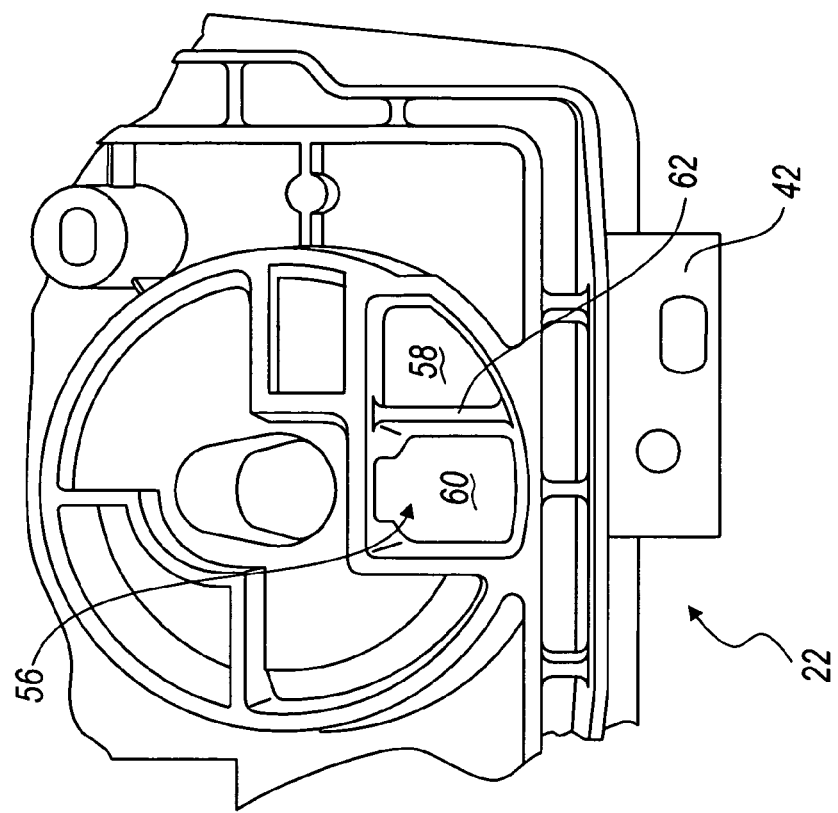
FIG. 4 is a rear view of the housing.
Figure 5:
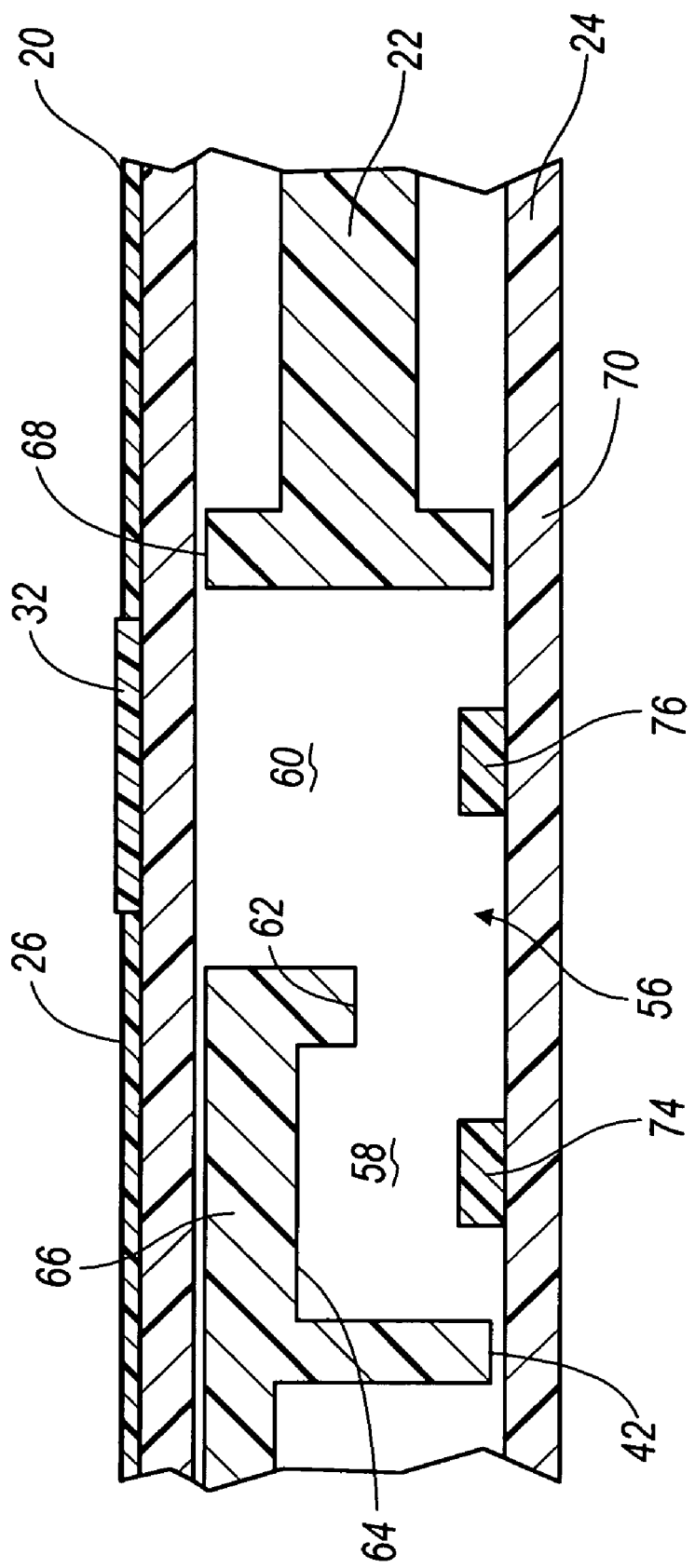
FIG. 5 is a cross-sectional view of a portion of the display taken along the line 5-5 of FIG. 1.

With reference to FIGS. 4 and 5, the rear face 42 of the housing 22 can define a cavity 56 having a first portion 58 and a second portion 60. A member 62 can be coupled to the housing 22 and can extend toward the circuit board assembly 24 into the cavity 56 to partly segregate the first and second portions 58 and 60 from one another. The member 62 can be a rib that is integrally formed with the housing 22. The interior surface 64 of the cavity 56 and/or one or more surfaces of the member 62 can be coated or formed to reflect light. In the particular example provided, the entire interior surface 64 of the cavity 56 and the surface of the member 62 are coated with a white paint. The first portion 58 of the cavity 56 can be offset from the second portion 60 of the cavity 56 and can be formed such that its front-facing side is closed (e.g., by another portion 66 of the housing 22). The second portion 60 can be disposed in-line with the second set of indicia 32 and can be open at its front-facing side. The size of the opening of the second portion 60 through the front side 68 of the housing 22 can be sized to encompass an area in which the second set of indicia 32 is disposed.

With renewed reference to FIG. 2, the circuit board assembly 24 can include a board member 70, an optional indicator drive means 72, a first light source 74, a second light source 76 and a controller 78. The board member 70 can be a printed circuit board and can include circuitry (not specifically shown) for electrically coupling the controller 78 to a source of electrical energy, such as the vehicle battery 80, and for electrically coupling the controller 78 to the first and second light sources 74 and 76 and to the indicator drive means 72. With brief additional reference to FIG. 5, the board member 70 can be coupled to the housing 22 and can close the cavity on 56 from a rear side of the housing 22. The board member 70 can be spaced apart from the member 62 by a predetermined distance, such as about 2.2 mm to about 8.9 mm.

The indicator drive means 72 can be conventional in its construction and operation and need not be discussed in detail herein. Briefly, the indicator drive means 72 can include a pointer 84 and a movement means 86 for driving the pointer 84 relative to the first set of indicia 30. The movement means 86 can be conventionally coupled to the board member 70 and received into the housing 22 so as to be shrouded by the portion of the housing 22 that forms the drive aperture 52. An output member (not specifically shown) of the movement means 86 can extend through the appliqué 20 and can be coupled to the pointer 84.

The first light source 74 can be any appropriate light source that produces light of a first color with a first intensity. For example, the first intensity can be less than or equal to about 10 cd/m², but it will be appreciated that other intensities outside this range could be used in the alternative. In the particular example provided, the first light source 74 is a light emitting diode that is coupled to the board member 70 and which provides illumination having a wavelength that is about 400 nanometers to about 500 nanometers with an intensity of about 10 cd/m². Preferably, the first light source 74 produces light that is blue in color.

The second light source 76 can be any appropriate light source that produces light of a second color with a second intensity that is greater than the first intensity. For example, the second intensity can be greater than or equal to about 100 cd/m², but it will be appreciated that other intensities outside this range could be used in the alternative. In the particular example provided, the second light source 76 is a light emitting diode that is coupled to the board member 70 and which provides illumination having a wavelength that is about 550 nanometers to about 700 nanometers with an intensity of about 100 cd/m². Preferably, the second light source 76 produces light that is amber in color.

The controller 78 can operate the movement means 86 in response to a corresponding indicator signal. In the particular example provided, the controller 78 operates the movement means 86 in response to a fuel level signal that is generated by a fuel level sensor (not shown) in a vehicle fuel tank (not shown). The controller 78 can also selectively operate the first and second light sources 74 and 76 in a predetermined manner. For example, the controller 78 can be configured to a) normally maintain both the first and second light sources 74 and 76 in an unilluminated state; b) maintain the first light source 74 in an illuminated state in response to a first condition; and c) maintain the second light source 76 in an illuminated state in response to a second condition. In the particular example provided, the first condition is a condition that warrants back-illumination of the appliqué 20 (e.g., when the vehicle head lamps are operated) and the second condition is a low fuel condition in the vehicle fuel tank (not shown). As the second intensity is greater than the first intensity, the controller 78 can be configured to apply electrical power with a first voltage or current to the first light source 74 and electrical power with a second voltage or current that is greater than the first voltage or current to the second light source 76.

With reference to FIGS. 2 and 5, the second set of display indicia 28 in the example provided will normally be maintained in a condition wherein it is not illuminated from behind (i.e., back-illuminated) as the first and second light sources 74 and 76 are normally maintained in a non-illuminated state. In response to a situation where the first condition is met but the second condition has not been met, however, the controller 78 will operate the first light source 74. Light produced by the first light source 74 travels from the first portion 58 of the cavity 56 into the second portion 60 and is directed upwardly to back-illuminate the second set of indicia 32 with a color that is associated with the first color. In the particular example provided, the second set of indicia 32 is formed with a grey or silver colored translucent ink or dye and as such, the second set of indicia 32 will appear blue in color when it is back-illuminated by only the first light source 74. Those of ordinary skill in the art will appreciate from this disclosure that one or more characteristics, including the size and geometry of the member 62, the distance between the member 62 between the first light source 74, the position of the first light source 74 within the first portion 58 of the cavity 56 (e.g., whether the first light source 74 is centered in the first portion 58 of the cavity 56), the appliqué transmissivity, the housing geometry, and the first intensity may be selected to control the uniformity with which the second set of display indicia 28 is back-illuminated by the first light source 74. It will also be appreciated that variables such as the size and geometry of the member 62 and/or the distance between the member 62 and the first light source 74 can be developed and/or confirmed via one or more prototype evaluations, ray trace analyses and/or lighting evaluations and measurements.

Similarly, in a situation where the second condition has been met but the first condition has not been met, the controller 78 will operate the second light source 76. Light produced by the second light source 76 is directed upwardly to back-illuminate the second set of indicia 32 with a color that is associated with the second color. In the particular example provided, the second set of indicia 32 will appear amber in color when it is back-illuminated by only the second light source 76.

In a situation where both the first and second conditions are met, the controller 78 will operate both the first and second light sources 74 and 76. As the first light source 74 produces light with a lower intensity than is produced by the second light source, the second set of indicia 32 will be back-illuminated with a color that is associated with the second color. In this manner, the second set of indicia 32 may be selectively illuminated in two (or more) colors without complicating the operation of the controller 78 or the construction of the housing 22. In the particular example provided, the gasoline pump symbol 34 and the triangle symbol 36 can be back-illuminated in a first color when the vehicle head lamps (not shown) are operated and can be back-illuminated in a second color during a low fuel condition regardless of whether the vehicle head lamps are operated.

While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out this invention, but that the scope of the present disclosure will include any embodiments falling within the foregoing description and the appended claims.

What is claimed is:

1. A display comprising:
   a housing defining a cavity, the cavity having a first portion and a second portion;
   a first light source disposed in the first portion of the cavity, the first light source being selectively operable for providing illumination of a first intensity;
   a second light source disposed in the second portion of the cavity, the second light source being selectively operable for providing illumination with a second intensity, the second intensity being greater than the first intensity; and
   an appliqué coupled to the housing, the appliqué including an opaque background and a translucent display indicium, the translucent display indicium being disposed in-line with the second light source;
   wherein the first and second light sources are operated in a first mode, wherein the first light source is operated and the second light source is not operated so that the display indicium is back-illuminated by the first light source so that the back-illuminated display indicium has a first color that is associated with a color of the first light source, and wherein the first and second light sources are operated in a second mode, wherein the first and second light sources are operated so that the display indicium is back-illuminated by the first and second light sources so that the back-illuminated display indicium has a second color that is associated with a color of the second light source.

2. The display of claim 1, wherein the housing further includes a rib member, the rib member extending into the cavity and partly segregating the first and second portions from one another.

3. The display of claim 2, wherein the first intensity is less than or equal to about 10 cd/m$^2$.

4. The display of claim 3, wherein the second intensity is greater than or equal to about 100 cd/m$^2$.

5. The display of claim 1, wherein the first light source provides illumination having a wavelength that is about 400 nanometers to about 500 nanometers.

6. The display of claim 1, wherein the second light source provides illumination having a wavelength that is about 550 nanometers to about 700 nanometers.

7. A method comprising:
   providing a vehicle display with an appliqué, a housing, a first light source and a second light source, the appliqué coupled to the housing and having a display indicium, the housing with a cavity having a first portion offset from a second portion, the first portion housing the first light source, the second portion housing the second light source and being disposed in-line with the display indicium and encompassing an entire area of the display indicium, the first light source selectively generating light at a first wavelength, the second light source selectively generating light at a second wavelength that is longer than the first wavelength;
   illuminating the first light source such that the display indicium is back-illuminated by light of a first color; and
   illuminating the second light source while the first light source is illuminated such that the display indicium is back-illuminated by light of a second color,
   wherein illuminating the second light source while the first light source is illuminated further comprises:
      driving the second light source at a higher current than the first light source.

8. The method of claim 7, wherein the light generated by the first light source has a first intensity and the light generated by the second light source has a second intensity that is greater than the first intensity.

9. The method of claim 8, wherein the first intensity is less than or equal to about 10 cd/m$^2$.

10. The method of claim 9, wherein the second intensity is greater than or equal to about 100 cd/m$^2$.

11. The method of claim 7, wherein the first wavelength is about 400 nanometers to about 500 nanometers.

12. The method of claim 7, wherein the second wavelength is about 550 nanometers to about 700 nanometers.

13. A display comprising:

an indicator surface for providing information, the indicator surface including a display indicium;

a housing with a chamber having a first section directly beneath the indicator surface and encompassing an entire area of the indicator surface, the chamber having a second section offset from the first section;

a circuit board coupled to the housing and closing a rearward side of the chamber;

a first light emitting diode mounted on the circuit board within the second section of the chamber for lighting the indicator surface in a first condition;

a second, different colored light emitting diode mounted on the circuit board within the first section of the chamber for lighting the indicator surface in a second condition; and a member coupled to the housing and partially separating the first section of the chamber from the second section of the chamber, the member having an edge that is spaced apart from the circuit board by a predetermined distance such that the member cooperates with the first light emitting diode to control an intensity and uniformity of light transmitted through the display indicium when only the first light emitting diode is producing light.

14. The display of claim 13, further comprising a controller associated with the circuit board for driving the second light emitting diode at a higher current than the first light emitting diode when the second condition occurs.

15. The display of claim 13, wherein the member is integrally formed with the housing.

16. The display of claim 15, wherein the member is a rib.

* * * * *